United States Patent
Guidolin et al.

(10) Patent No.: US 9,752,716 B2
(45) Date of Patent: Sep. 5, 2017

(54) SYSTEM FOR MOUNTING VIDEO/PHOTOGRAPHIC EQUIPMENT ON A SUPPORT HEAD

(71) Applicant: LINO MANFROTTO + CO. S.p.A., Cassola (IT)

(72) Inventors: Davide Guidolin, Rosa' (IT); Paolo Speggiorin, Mussolente (IT)

(73) Assignee: LINO MANFROTTO + CO S.P.A., Cassola (VI) (IT)

( * ) Notice: Subject to any disclaimer, the term of this patent is extended or adjusted under 35 U.S.C. 154(b) by 25 days.

(21) Appl. No.: 14/377,851

(22) PCT Filed: Feb. 4, 2013

(86) PCT No.: PCT/IB2013/050936
§ 371 (c)(1),
(2) Date: Aug. 10, 2014

(87) PCT Pub. No.: WO2013/118045
PCT Pub. Date: Aug. 15, 2013

(65) Prior Publication Data
US 2015/0028171 A1  Jan. 29, 2015

(30) Foreign Application Priority Data
Feb. 10, 2012  (IT) .............. PD2012A0034

(51) Int. Cl.
*F16M 13/08*  (2006.01)
*F16M 11/04*  (2006.01)
*F16M 11/10*  (2006.01)

(52) U.S. Cl.
CPC ......... *F16M 11/041* (2013.01); *F16M 11/043* (2013.01); *F16M 11/048* (2013.01);
(Continued)

(58) Field of Classification Search
USPC ... 248/222.11, 221.11, 225.21, 177.1, 178.1, 248/183.3, 187.1; 403/321, 322.1, 322.4,
(Continued)

(56) References Cited

U.S. PATENT DOCUMENTS 3,429,543 A * 2/1969 Mooney ................ F16M 11/04
248/346.04
3,612,462 A * 10/1971 Mooney ................ F16M 11/04
248/187.1
(Continued)

FOREIGN PATENT DOCUMENTS

| DE | 2747677 A1 | 4/1979 |
| EP | 2343595 A2 | 7/2011 |
| FR | 2552579 A1 | 3/1985 |

OTHER PUBLICATIONS

International Preliminary Report on Patentability dated May 2, 2014 in PCT/IB2013/050936.
(Continued)

*Primary Examiner* — Alfred Wujciak
(74) *Attorney, Agent, or Firm* — Kristina Castellano; Castellano PLLC

(57) ABSTRACT

A system (1) for mounting video/photographic equipment (2) on a support head (3), the system comprising a mounting plate (4) which can be fixed to a lower part of the equipment and a seat (20) which is formed in a body (21) of the head and which can house the plate so that the plate can slide along a longitudinal axis (X). A hook (30) is provided on the head and is arranged to pivot between a first, seat-closing, position in which the plate is retained in the seat and a second, seat-opening, position in which the plate is free to enter or leave the seat along an insertion axis (Z) substantially perpendicular to the longitudinal direction (X). The head further comprises locking means for locking the plate inside the seat (20) in a desired position on the longitudinal (Continued)

axis, which comprise a pin (35) which is fixed to the hook and can be translated relative thereto, and which is adapted to bear on the body of the head in order to urge the hook into the first position against the plate. The pin (35) comprises an operating appendage (36) projecting from the hook and operable to pivot the hook from the first to the second position.

7 Claims, 2 Drawing Sheets

(52) U.S. Cl.
CPC ......... *F16M 11/10* (2013.01); *F16M 2200/02* (2013.01); *F16M 2200/021* (2013.01)

(58) Field of Classification Search
USPC .................................................. 403/326, 330
See application file for complete search history.

(56) References Cited

U.S. PATENT DOCUMENTS

| | | | | |
|---|---|---|---|---|
| 5,680,725 | A * | 10/1997 | Bell | F41G 11/003 |
| | | | | 42/127 |
| 6,371,424 | B1 * | 4/2002 | Shaw | F16M 11/02 |
| | | | | 248/187.1 |
| 6,922,934 | B1 * | 8/2005 | Huan | F41G 11/003 |
| | | | | 42/127 |
| 7,308,772 | B1 * | 12/2007 | Millett | F41G 11/004 |
| | | | | 42/124 |
| 8,794,575 | B2 * | 8/2014 | Vogt | F16M 11/04 |
| | | | | 248/177.1 |
| 2003/0218108 | A1 | 11/2003 | Werner | |

OTHER PUBLICATIONS

International Search Report and Written Opinion dated Apr. 22, 2013 in PCT/IB2013/050936.

* cited by examiner

SYSTEM FOR MOUNTING VIDEO/PHOTOGRAPHIC EQUIPMENT ON A SUPPORT HEAD

CLAIM FOR PRIORITY

This application is a U.S. National Stage Application of PCT/IB2013/050936 filed on Feb. 4, 2013, which claims priority to Italian Patent Application PD2012A000034 filed Feb. 10, 2012, the contents of both of which are hereby incorporated herein by reference.

TECHNICAL FIELD

The present invention relates to a system for mounting video/photographic equipment on a support head, having the features stated in the preamble of the main claim.

PRIOR ART

In the technical field of the invention, there are known and widely used systems for mounting an item of video/photographic equipment on a support head.

A known mounting system typically comprises a plate, which is fixed to the lower part of the equipment, and a seat formed on the support head, which can house the plate so that the plate can slide along a longitudinal axis of the plate. This feature enables the position of the equipment to be suitably adjusted with respect to the mounting head so as to balance the equipment correctly on the head. The known mounting system also has locking means provided on the support head, which can lock the equipment in the desired position in the seat.

The seat formed on the support head typically has a dovetail profile with a bearing surface enclosed between a pair of lateral guides with inclined walls, and the support plate is inserted into the seat tangentially, with a movement parallel to the bearing surface of the seat.

However, this operation may prove to be difficult because the insertion requires a rather precise condition of alignment between the plate and the seat, and the plate is generally concealed from view because it is located on the lower part of the equipment.

DISCLOSURE OF THE INVENTION

The problem underlying the present invention is that of providing a system for mounting video/photographic equipment on a support head which overcomes the limitations described above with reference to the cited prior art.

Within the scope of this problem, one object of the invention is to develop a mounting system which is reliable and can be easily manufactured and produced at limited cost.

This problem is resolved and this object is achieved by the present invention by means of a mounting system made in accordance with the appended claims.

BRIEF DESCRIPTION OF THE DRAWINGS

The characteristics and advantages of the present invention will be made clearer by the following detailed description of a preferred example of embodiment thereof, illustrated in a non-limiting way for information only, with reference to the attached drawings, in which.

PREFERRED EMBODIMENT OF THE INVENTION

Figure 1:
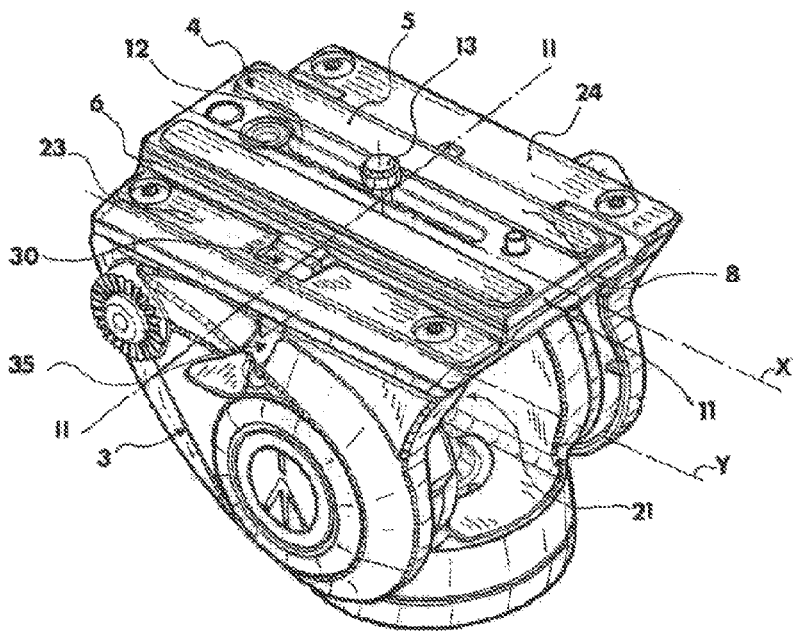
FIG. 1 is a perspective view from above of a system for mounting an item of video/photographic equipment on a support head, made according to the present invention.
Figure 2:
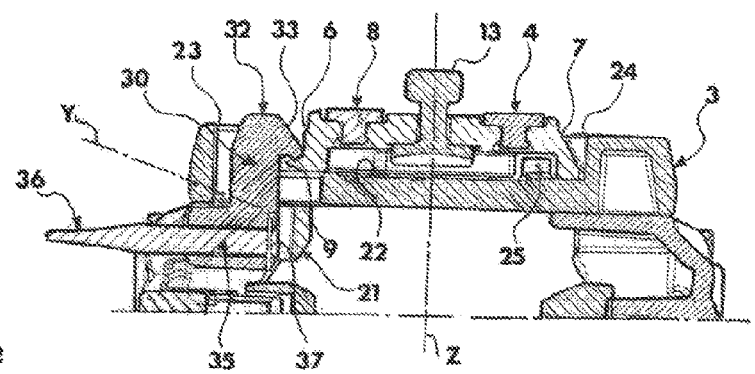
FIG. 2 is a cross-sectional view taken along the line II-II of the mounting system of FIG. 1.
Figure 3:
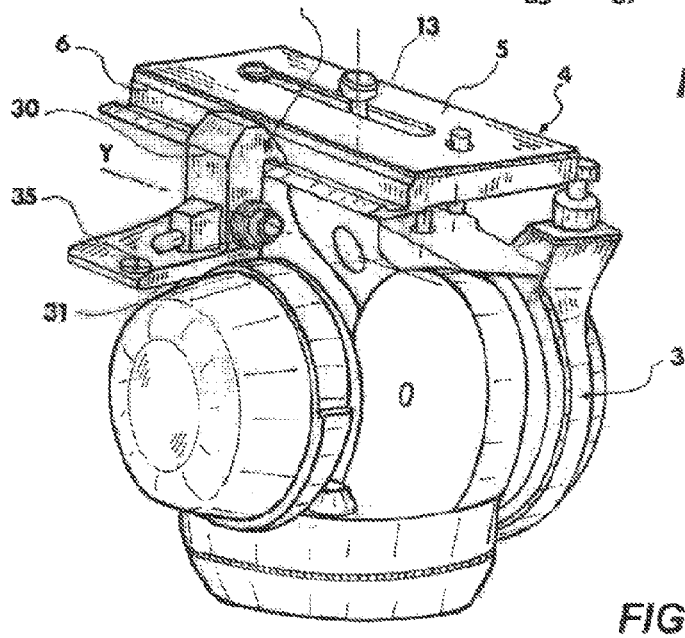
FIG. 3 is a lateral perspective view of the mounting system of FIG. 1 with some components removed.
Figure 6:
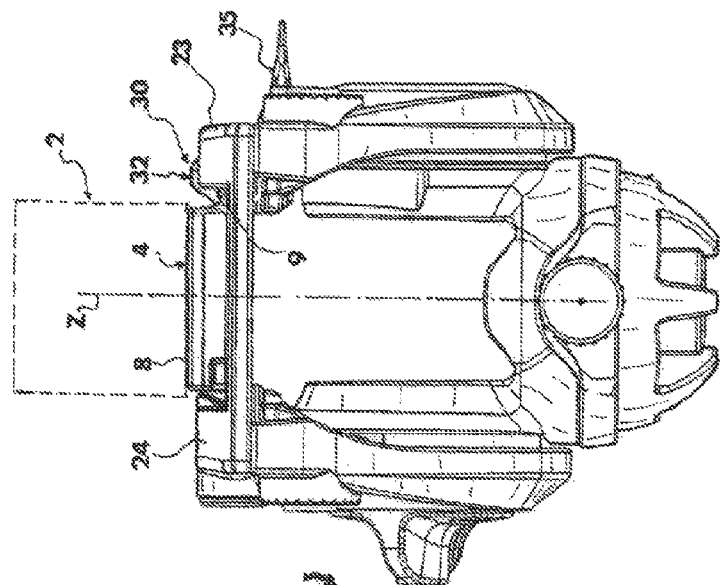
FIGS. 4 to 6 are rear views of the mounting system of FIG. 1 in respective operating positions.
Figure 5:
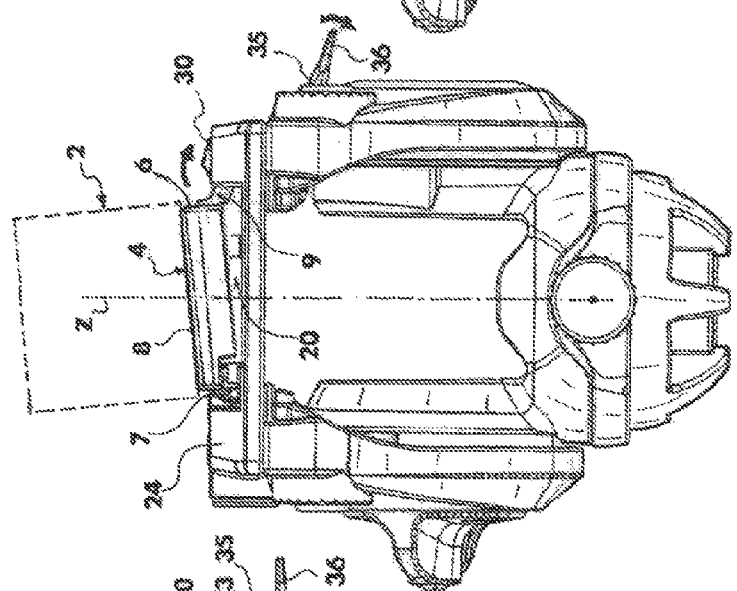
Figure 4:
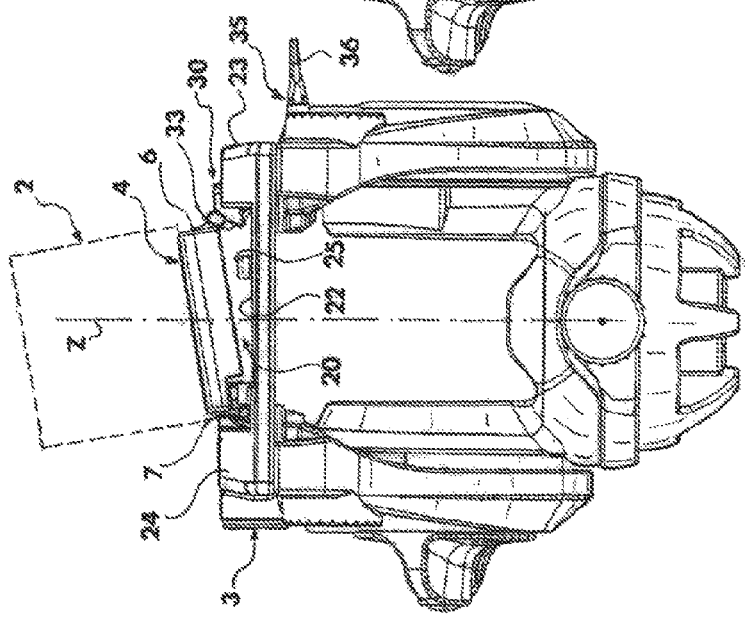

With reference to the attached drawings, the number 1 indicates the whole of a system for mounting an item of video/photographic equipment 2, illustrated in a purely schematic way in broken lines in FIGS. 4 to 6, on a support head 3, made according to the present invention.

The mounting system 1 comprises a mounting plate 4, which can be fixed removably to a lower part of the equipment 2, and which comprises a central body 5 of generally rectangular and substantially flat configuration, extending predominantly along a longitudinal axis X. The central body 5 is delimited longitudinally by a first and a second side, identified by 6 and 7 respectively, projecting on opposite sides of a surface 8, formed on the central body 5, on which the equipment 2 rests.

The first side 6 has a shelf-like profile with a flange 9 extending substantially parallel to the surface 8, in a lower position and in a direction away from the central body 5. The free edge of the flange 9, remote from the central body 5, is slightly thicker than the remaining portion of the flange 9.

The second side 7 has a profile in the form of an inclined plane diverging from the surface 8.

The central body 5 of the plate 4 is also delimited longitudinally by opposing edges 11, which are also bent back on the side opposite the surface 8.

In a median region of the central body 5 of the mounting plate 4 there is also formed a longitudinal slot 12 in which a connecting pin 13 is slidably engaged, this pin being engageable with a corresponding seat provided in the lower part of the equipment 2, according to features known in the art.

The system 1 further comprises a seat 20 formed at the top of a body 21 of the support head 3, which can house and engage the plate 4 so that the plate can slide along the longitudinal axis X.

For this purpose, the seat 20 comprises a base 22, forming a surface for supporting the plate 4, which base is enclosed between a first and a second lateral guide 23 and 24 which are substantially parallel to the longitudinal axis X, the base being open at its opposite longitudinal ends.

In order to prevent the plate 4 from moving out of the longitudinal ends of the seat 20, suitable travel limit elements are provided, comprising, for example, projections 25 rising from the base 22 and capable of bearing on the longitudinal edges 11 of the plate. It should be noted that the projections are thus concealed from view when the plate 4 is coupled to the head 3.

The second lateral guide 24 has a profile which is inclined with respect to the base 22, and which converges towards a median plane of the seat 20, so as to mate with the shape of the second side 7 of the plate 4.

The first lateral guide 23 has a profile substantially perpendicular to the base 22.

On the first lateral guide 23 there is provided a hook 30 which is pivoted on the body 21 and which can pivot about a pivot axis Y, substantially parallel to the longitudinal axis X, between a first, seat-closing, position, in which the plate 4 is retained in the seat 20, and a second position for opening the seat 20, in which the plate 4 is free to enter or leave the seat 20 along an insertion axis Z substantially perpendicular to the longitudinal axis X and to the base 22.

The hook 30 is elastically urged into the aforesaid first position by a spring 31, and comprises, at its end associated with the first lateral guide 23, a tooth 32 which can bear on the flange 9 of the first side 6 of the plate 4.

In particular, when the hook 30 has been pivoted into the first position, the tooth 32 is located on the opposite side of the flange 9 from the base 22, acting in combination with the second lateral guide 24 to prevent the plate 4 from moving out of the seat 20 along the insertion axis Z.

A bearing surface 33 is advantageously formed on the tooth 32, such that, when the hook has pivoted into the first position, it is inclined towards the base 22 in such a way that the entry of the plate 4 into the seat 20 along the insertion axis Z initially causes the first side 6 of the plate 4 to contact the bearing surface 33 and then causes the hook 30 to pivot from the first position to the second position, allowing the entry of the plate 4 into the seat 20 to be completed.

Also provided on the head 3 are locking means designed to lock the plate 4 inside the seat 20 in a desired position on the longitudinal axis, these means comprising a pin 35 which is fixed to the hook 30 and can be translated relative thereto, and which can abut the body 21 in order to urge the hook 30, pivoted into the aforesaid first position, against the plate 4.

The pin 35 is fixed, by a penetrating screw fastening, to the hook 30 on the opposite side of the pivot axis Y from the tooth 32, and comprises an operating appendage 36, projecting outside the head 3, and a head 37 projecting on the opposite side from the hook 30, towards the body 21.

Thus, when the pin 35 is screwed into the hook 30, the head 37 is brought towards the body 21, thus progressively limiting the amplitude of the pivoting of the hook 30, starting from the first position, up to the point where pivoting is completely prevented. Additionally, when the pin 35 is fully screwed in, the hook is pivoted further against the first side 6 of the plate 4, thereby locking it against the base 22 of the seat 20, while also preventing any movement of the plate along the longitudinal axis X.

The operation of the mounting system 1 is clearly shown in FIGS. 4 to 6. The equipment 2, to the lower part of which the plate 4 is fixed, is hooked on to the head 3 from above, along the insertion axis Z, by first inserting the second side 7 of the plate 4 into the seat 20 and then exerting a pressure towards the base 22 (FIG. 4). This action initially causes the first side 6 of the plate 4 to contact the bearing surface 33 of the tooth 32, and consequently causes the hook 30 to pivot from the first to the second position (FIG. 5). It should be noted that the hook 30 can also be pivoted easily from the first to the second position by direct action on the operating appendage 36.

In this configuration, the hook 30 is outside the seat 20, and does not interfere with the passage of the plate 4; consequently, the latter can enter fully into the seat 20, bearing on the base 22. Because of the action of the spring 31, the hook 30 then returns to the first position so as to prevent the seat 20 from moving out of the plate 4 (FIG. 6).

In this configuration, the equipment 2 can easily be moved along the longitudinal axis X so as to be brought into the position which allows the system to be correctly balanced.

At this point, the pin 35 is screwed in until the head 37 bears on the body 21 and the tooth 32 is pivoted further against the flange 9, thus locking the plate 4 in position.

The plate 4 is disengaged from the seat 20 by unscrewing the pin 35 by a suitable amount and then acting on the operating appendage 36 to pivot the hook 30 from the first to the second position, so that the plate 4 can be conveniently extracted from the seat 20.

Thus the present invention resolves the problem outlined above, while also providing numerous other benefits, including the fact that a smaller number of components is required for its production. The system can also be operated very rapidly and simply by the user.

A further advantage is that, since the locking pin is made to be fixed directly to the hook, a more compact support head can be produced, thus reducing the overall dimensions of the product, since the plate hooking and locking mechanisms are substantially combined in a single mechanism.

Furthermore, also because of the feature mentioned above, the operations of hooking and unhooking the video/photographic equipment can be carried out with one hand only, while the other hand holds the equipment, thus facilitating these operations and improving the safety thereof.

The invention claimed is:

1. A system mounting video/photographic equipment on a support head, the system comprising
    a mounting plate which can be fixed to a lower part of the equipment and a seat which is formed in a body of the head and which can house the plate so that the plate can slide along a longitudinal axis (X), a hook being provided on the head and being arranged to pivot between a first, seat-closing position in which the plate is retained in the seat and a second seat-opening position in which the plate is free to enter or leave the seat along an insertion axis (Z) substantially perpendicular to the longitudinal direction (X), as well as locking means for locking the plate inside the seat in a desired position on the longitudinal axis,
    wherein the locking means comprise a pin which is fixed to the hook and can be translated relative thereto, and which is adapted to abut the body in order to urge the hook into the first position against the plate, and in that the pin comprises an operating appendage operable so that the pin pivots the hook from the first to the second position;
    wherein the seat comprises a base forming a surface for supporting the plate, which surface is enclosed between a first and a second lateral guide which are substantially parallel to the longitudinal axis (X), the hook being articulated in the region of the first lateral guide.

2. The mounting system according to claim 1, wherein the hook is articulated on the body for pivoting about a pivot axis (Y) substantially parallel to the longitudinal axis and comprises a tooth which can abut the plate when the plate is housed in the seat.

3. The mounting system according to claim 2, wherein a bearing surface is defined on the tooth, which, when the hook has pivoted to the first position, is inclined towards a base of the seat so that the entry of the plate into the seat along the insertion axis leads to pivoting of the hook from the first position towards the second position.

4. The mounting system according to claim 2, wherein the pin is fixed to the hook on the side of the pivot axis (Y) opposite the tooth.

5. The mounting system according to claim 1, wherein the hook is urged resiliently into the first position.

6. The mounting system according to claim 1, wherein the pin is engaged in the hook by screwing.

7. The mounting system according to claim 1, wherein travel limit elements are provided on the base to limit the sliding of the plate along the longitudinal axis inside the seat.

\* \* \* \* \*